(12) United States Patent
Hippel et al.

(10) Patent No.: US 7,195,313 B2
(45) Date of Patent: Mar. 27, 2007

(54) CRASH-ACTIVE HEADREST

(75) Inventors: Daniel Hippel, Winnweiler (DE); Harald Klein, Matzenbach (DE); Jürgen Schilling, Kaiserslautern-Erlenbach (DE); Andreas Diehl, Otterbach (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/287,578

(22) Filed: Nov. 23, 2005

(65) Prior Publication Data

US 2006/0071518 A1 Apr. 6, 2006

Related U.S. Application Data

(63) Continuation of application No. PCT/EP04/05631, filed on May 26, 2004.

(30) Foreign Application Priority Data

Jun. 5, 2003 (DE) ................. 103 25 472

(51) Int. Cl.
*B60N 2/42* (2006.01)
(52) U.S. Cl. ................. 297/216.12; 297/408
(58) Field of Classification Search .......... 297/216.12, 297/391, 408, 410, 404
See application file for complete search history.

(56) References Cited

U.S. PATENT DOCUMENTS

| | | | |
|---|---|---|---|
| 3,586,366 A | 6/1971 | Patrick | |
| 3,838,870 A | 10/1974 | Hug | |
| 4,511,180 A | 4/1985 | Klaus | |
| 4,668,014 A | 5/1987 | Boisset | |
| 4,762,367 A * | 8/1988 | Denton | 297/409 |
| 5,290,091 A | 3/1994 | Dellanno et al. | |
| 5,738,412 A | 4/1998 | Aufrere et al. | |
| 5,820,211 A | 10/1998 | Heilig et al. | |
| 5,934,750 A | 8/1999 | Föhl | |
| 6,074,011 A | 6/2000 | Ptak et al. | |
| 6,082,817 A | 7/2000 | Müller | |
| 6,203,105 B1 | 3/2001 | Rhodes, Jr. | |
| 6,213,548 B1 | 4/2001 | Van Wynsberghe et al. | |

(Continued)

FOREIGN PATENT DOCUMENTS

| | | |
|---|---|---|
| DE | 39 00 495 A1 | 7/1990 |
| DE | 296 03 467 U1 | 8/1996 |
| DE | 296 14 238 U1 | 12/1996 |

(Continued)

OTHER PUBLICATIONS

U.S. Appl. No. 10/727,867, filed Dec. 4, 2003; In re: Volker Schafer, entitled *Head Restraint for a Vehicle Seat*.

Primary Examiner—David R. Dunn
Assistant Examiner—Erika Garrett
(74) Attorney, Agent, or Firm—Womble Caryle Sandridge & Rice, PLLC

(57) ABSTRACT

In a headrest (201) for a vehicle seat, having a support (205), at least one upper and lower linkage (211, 215) hinged to the support (205), which are pivotable around horizontal axles (207, 217), an impact element (213) hinged to the linkages (211, 215), which forms at least one four-bar linkage (219) with the linkages (211, 215) and the support (205), and an energy storage, the energy storage driving the four-bar linkage (219) in the event of a crash, so that the impact element (213) is driven out forwardly from an initial position into a crash position that is locked rearward by a crash lock, a drive (271) is provided by way of which, in normal use, the headrest (201) can be brought from its initial position to at least one other comfort position.

23 Claims, 3 Drawing Sheets

U.S. PATENT DOCUMENTS

| | | |
|---|---|---|
| 6,478,373 B1 | 11/2002 | Hake et al. |
| 6,623,073 B2 | 9/2003 | Schäfer et al. |
| 6,688,697 B2 | 2/2004 | Baumann et al. |
| 6,715,829 B2 * | 4/2004 | Svantesson et al. ... 297/216.12 |
| 6,802,562 B1 * | 10/2004 | Hake et al. ............ 297/216.12 |
| 6,824,212 B2 * | 11/2004 | Malsch et al. ......... 297/216.12 |
| 2001/0040396 A1 | 11/2001 | Kreuels et al. |
| 2002/0043860 A1 | 4/2002 | Dinkel et al. |
| 2005/0127726 A1 | 6/2005 | Schilling et al. |

FOREIGN PATENT DOCUMENTS

| | | |
|---|---|---|
| DE | 197 07 998 A1 | 9/1998 |
| DE | 197 57 533 A1 | 10/1998 |
| DE | 299 07 245 U1 | 9/1999 |
| DE | 699 02 150 T2 | 6/2000 |
| DE | 199 23 659 A1 | 11/2000 |
| DE | 199 51 966 A1 | 5/2001 |
| DE | 100 01 329 A1 | 7/2001 |
| DE | 100 04 766 A1 | 8/2001 |
| DE | 100 26 978 C1 | 10/2001 |
| DE | 100 47 406 A1 | 4/2002 |
| DE | 102 02 598 A1 | 8/2003 |
| EP | 0 974 484 A2 | 1/2000 |
| EP | 0 976 608 A1 | 2/2000 |
| EP | 1 193 114 A1 | 4/2002 |
| FR | 2 832 364 | 5/2003 |
| JP | 10278648 | 10/1998 |
| JP | 11321502 | 11/1999 |
| WO | WO 98/24652 A1 | 6/1998 |
| WO | WO 01/12465 | 2/2001 |
| WO | WO 03/084777 | 10/2003 |

* cited by examiner

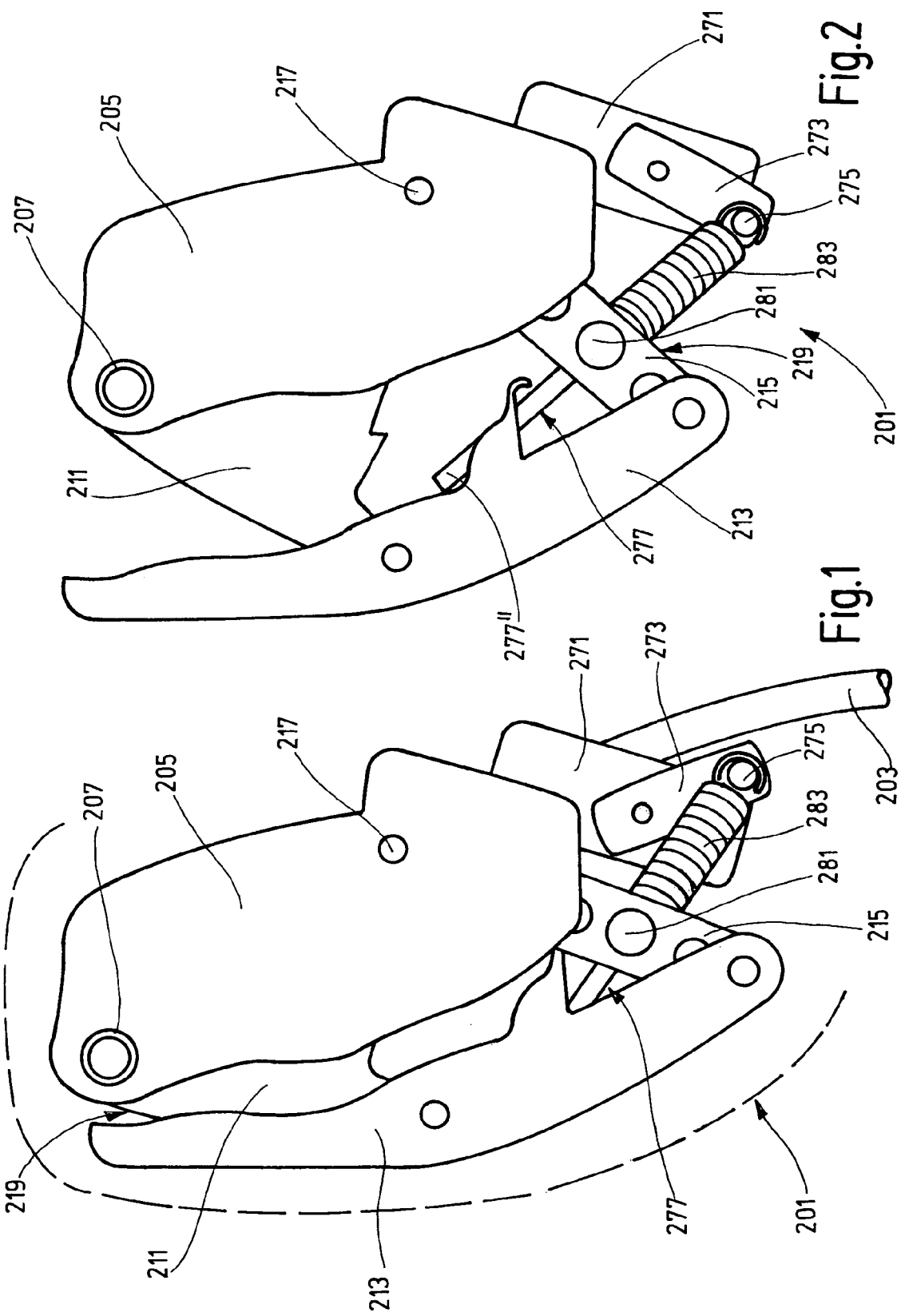

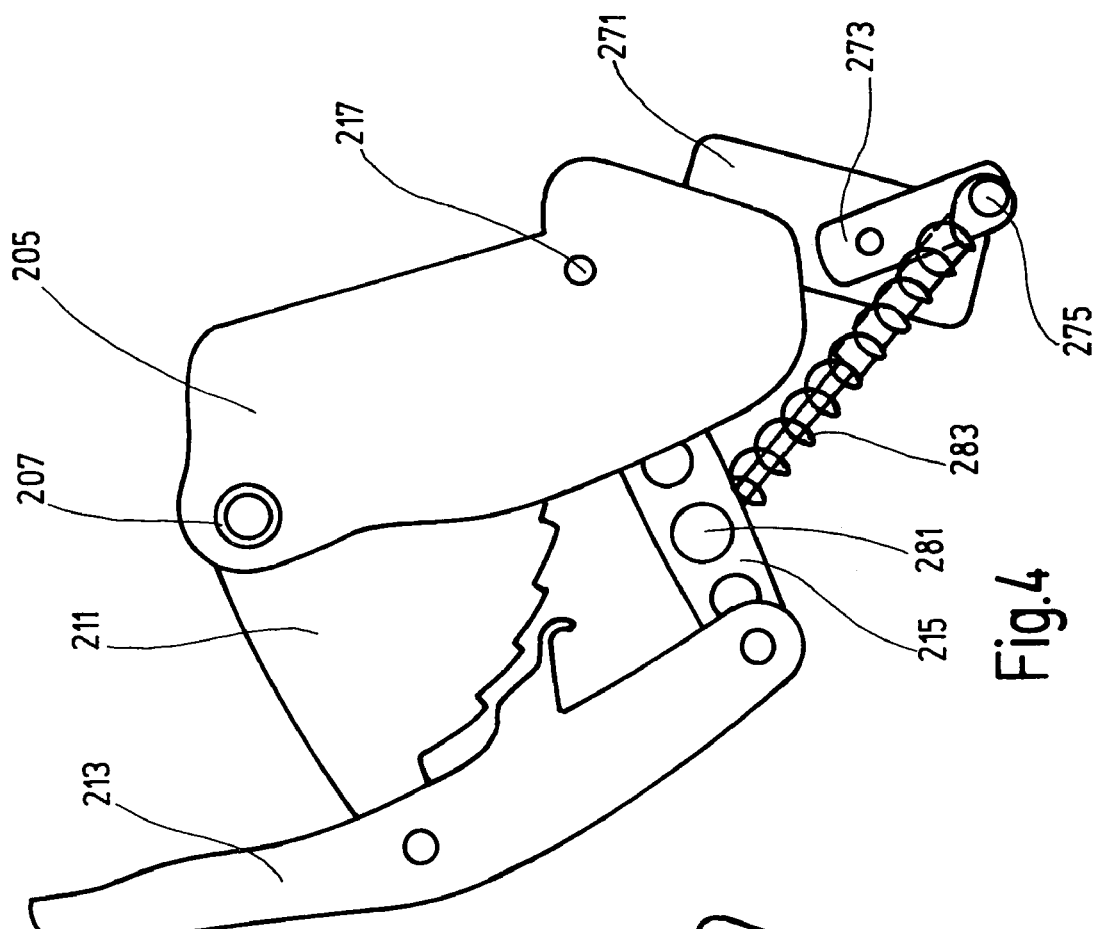
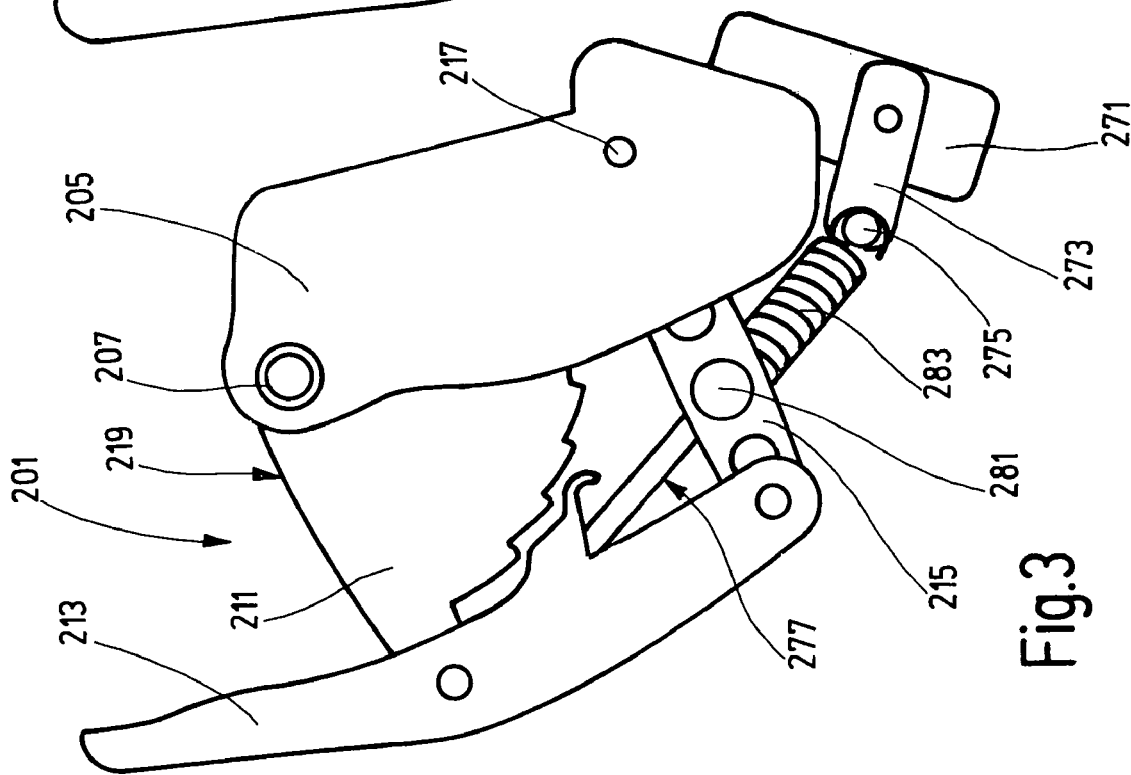

CRASH-ACTIVE HEADREST

CROSS-REFERENCE TO RELATED APPLICATION

The present application is a continuation of International Application PCT/EP2004/005631, which was filed May 26, 2004. The disclosure of International Application PCT/EP2004/005631, which was filed May 26, 2004, is incorporated herein by reference, in its entirety.

BACKGROUND OF THE INVENTION

The present invention relates to a headrest having a support; at least one upper and lower linkage that are each hinged to the support as a result of the upper and lower linkages respectively being pivotable around horizontal axles; an impact element hinged to the linkages so that the impact element together with the linkages and the support form at least one four-bar linkage; an energy storage device that, in the event of a crash, drives the four-bar linkage so that the impact element moves forwardly out from an initial position to a crash position, and a crash lock for restricting rearward movement of the impact element while the impact element is in the crash position.

A headrest of the type described immediately above is known from DE 199 51 966 A1, in which the impact element comes out in the event of a crash by means of a four-bar linkage in the form of a parallelogram, and the drive being a spring-loaded swivel arm which locks in the crash position.

BRIEF SUMMARY OF SOME ASPECTS OF THE INVENTION

An aspect of the present invention is the provision of improvements to a headrest that is generally of the type described immediately above. In accordance with one aspect of the present invention, a headrest for a vehicle seat is for operating during at least both a crash and a period of normal use that does not include a crash, and the headrest includes at least one four-bar linkage, an energy storage device, a drive and a crash lock. The four-bar linkage can include a support, upper and lower linkages that are each mounted for pivoting relative to the support, and an impact element. The upper and lower linkages are also mounted for pivoting relative to the impact element. The energy storage device is for driving the four-bar linkage in response to the crash, and thereby changing the four-bar linkage's configuration in a first predetermined manner, so that the impact element moves forwardly away from the support from an initial position to a crash position. The upper and lower linkages pivot relative to both the support and the impact element while the impact element moves forwardly away from the support. The crash lock is for restricting rearward movement of the impact element while the impact element is in the crash position. The drive is operative for at least indirectly bringing the headrest from the initial position to at least one other comfort position during the period of normal use.

The provision of the at least one other comfort position into which the headrest can be brought from the initial position in normal use has the advantage that the existing mobility of the headrest can also be used for improving comfort. The initial position in this case is a first comfort position. This way, in the event of a crash, a crash position can be reached from any comfort position. By providing a drive, for example a motorized, pneumatic or hydraulic drive, this transfer towards the other comfort positions can be achieved for the passenger comfortably and without much effort, in particular at the moment when sitting down, so that there is no more need for an alternation between manual setting and testing for iteratively achieving the ideal position. The at least two comfort positions, including the initial position, are thus not manually approached; rather, they are approached by means of the drive. In order to make the transition from the initial position (or any other comfort position) to the crash position independent from the transition from the initial position to any other comfort position, it is preferable to have different drives for these two transitions, i.e. altogether two drives.

Several crash positions that are locked, with respect to backward movement, by the crash lock have the advantage that in the event of a crash, the forward moving impact element can be blocked immediately after coming in contact with the backward moving head of a passenger. The head is then caught as much to the front as possible and does not receive any additional momentum from the undecelerated headrest. This prevents any additional load on the passenger. For the simple and cost effective production of such a crash lock, an embodiment has an at least partially mobile crash lock part, which is mounted on the support, and a crash lock toothing, which is on at least one of the linkages or on a component that is moved together with the linkages. The crash lock toothing is for cooperating in each crash position with the crash lock part, with several crash positions being defined, for example, by several teeth. By choosing a kind of saw tooth, the locking action is limited to one direction, i.e. the forward movement of the impact element is not impeded.

Preferably, the drive acts on the kinematics of the headrest via a guide tappet like an arm or via a spindle-spindle nut system, so that favorable lever conditions can be obtained. For instance, a pivotable adjuster lever can be active between the drive and the guide tappet. As such, an adjuster lever can be simply connected to a motor or a cylinder.

The guide tappet preferably has a tappet section which bears against the four-bar linkage, or bears against a transverse link between the four-bar linkages provided, for driving the four-bar linkage(s) outward. For movement in the opposite direction, i.e. in the direction of driving in, a reset spring bears on the four-bar linkage. For instance, the reset spring can be arranged next to the guide tappet, which should also be understood as an arrangement around the guide tappet. As long as a reset movement is not considered important, the guide tappet can also be maintained in a retracted position by means of a clip or similar device. For a smooth movement of the four-bar linkage(s) into the crash position, which also facilitates re-setting, the guide tappet preferably also has a guide section with a diameter that is smaller than that of the tappet section, so that it can detach itself from the four-bar linkage or the transverse link. The preferably staggered transition area between the different diameters can serve as a stop.

The inventive drive can also be used for deploying the headrest into the crash position even before a crash, for example, on a signal from a pre-crash sensor that detects an imminent crash by too small a distance from the vehicle ahead or behind, or in the event of sharp braking. Preferably, this way the triggering of the crash function remains intact due to a triggering unit provided for this purpose, overriding the comfort setting function and the pre-crash function. Even if the impact element is completely deployed, the above-mentioned trigger unit triggers the crash function in the event of a crash.

The headrest system is stabilized by upper and lower linkages that are arranged with respect to one another in an nonparallel arrangement, i.e. by means of a four-bar linkage deviating from the form of a parallelogram. With this, one avoids first a dead center in the four-bar linkage in the initial position, which might prevent the four-bar linkage from deploying in the event of a crash. Furthermore, the relevant lever arm acting on the linkages under the impact of forces coming from the front or from above can thus be kept short. Finally, one can also achieve a more favorable capture angle. Preferably, all this is achieved by a difference in the length of the linkages, for example by making the lower linkages longer than the upper linkages to the extent this concerns the distances of the joints in the four-bar linkage. The long lower linkages also have the advantage that when the four-bar linkage is deployed, the upholstery part of the impact element moves forward in the direction of travel mainly tangentially, this arrangement allowing a simpler trim and preventing collisions in the lower area.

Being able to reset the headrest reversibly after a crash makes it possible to re-use the headrest, saving material and labor costs. Preferably, the passenger can reset the headrest himself, which again saves labor costs. For this, a resetting device is provided, for example a movable pull, push or rotating element integrated in the headrest, or a tool to be inserted in the headrest after a crash. For example, the resetting device returns the crash lock and, if applicable, a magnetic trigger, to their initial position. Preferably, a resetting device integrated in the headrest is visible only after the crash; this way, any premature activation is excluded. Preferably, a resetting device in the form of a tool can be inserted in its longitudinal direction into the headrest; for this reason it has a more or less oblong shape and can thus be easily stowed away when not in use The energy storage device being in the form of a loaded spring has the advantage that with such a spring one can store enough energy to allow the four-bar linkage to come out quickly. Retaining this loaded spring by means of a swivelable pawl, performed directly or indirectly by holding an element the spring bears on, has the advantage that, on the one hand, the spring is contour locked to the pawl, and that, on the other hand, an appropriate alignment of the pawl creates favorable leverage conditions, thus requiring a lesser retaining force.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which:

FIG. 1 is a lateral view of the exemplary embodiment in the initial position,

FIG. 2 is an illustration according to FIG. 1, in the comfort position,

FIG. 3 is an illustration according to FIG. 1, in the crash position when using the pre-crash function, FIG. 4 is an illustration according to FIG. 3, in the crash position without using the pre-crash function.

DETAILED DESCRIPTION OF AN EXEMPLARY EMBODIMENT

Figure 5:
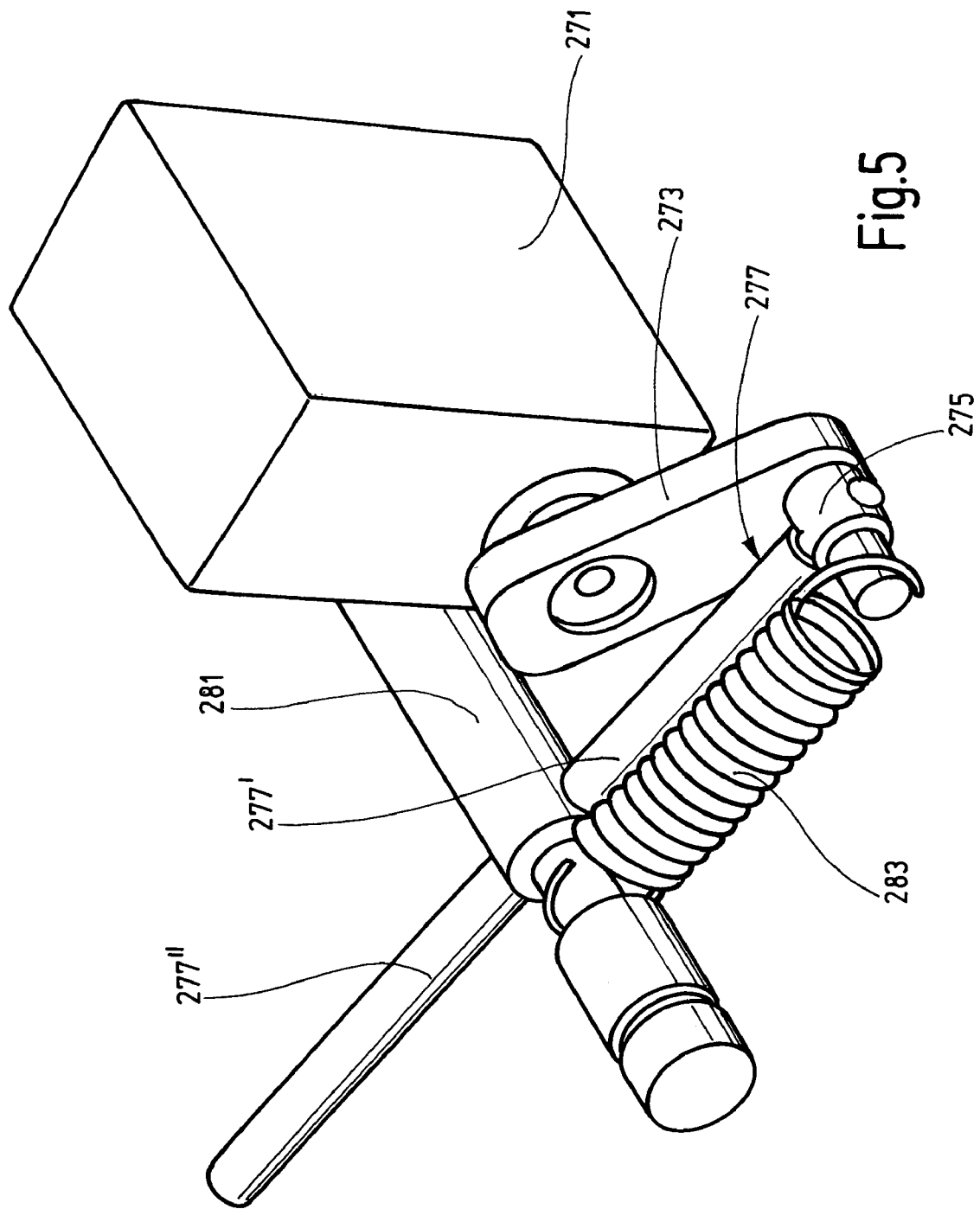
FIG. 5 is a perspective view of the drive for the comfort setting and the pre-crash function.

The exemplary embodiment is a headrest 201 for an automobile vehicle seat. The headrest 201 is adjustable with respect to its height by means of two parallel headrest bars 203 which are movably supported in the backrest of the vehicle seat. The headrest bars 203 are firmly inserted with their upper end in a support 205 which is arranged transversally to the headrest bars 203. A horizontally arranged axle 207 running transversally to the headrest bars 205 is supported at the upper end of the support 205.

A pair of upper linkages 211 is pivotably supported on the axle 207. The upper linkages 211 are arranged at a distance from one another. Each of the upper linkages 211 has an approximately triangular basic shape. The axle 207 is arranged in a corner of each upper linkage 211. The upper linkages 211 are parallel to one another, and they point forward and downward. In the frontmost corner of each upper linkage 211, the upper linkage is hinged to the upper end of a common impact element 213 (i.e., the impact element 213 is hinged to each of the upper linkages). The impact element 213 is arranged in front of the support 205 (in the direction of travel). Generally described, the impact element 213 consists of two laterally crooked flanks that are connected by means of two transverse bars running parallel to the axle 207. For technical reasons relating to production, the injection-molded plastic impact element 213 may be made of two generally mirror-symmetrical halves joined together. An upholstery part is arranged on the impact element 213. However, the impact element 213 can also be the upholstery support, i.e. the upholstery can be attached directly to the impact element 213.

Two lower linkages 215 of oblong shape are each hinged, on one hand, to the support 205 by means of a horizontal linkage bearing bolt 217 running parallel to the axle 207, and, on the other hand, to the lower end of the impact element 213. The support 205, the upper linkage 211, the impact element 213 and the lower linkage 215 together form a four-bar linkage 219. The lower linkage 215 is longer than the upper linkage 211, so that the upper linkage 211 and the lower linkage 215 are not parallel. Furthermore, the upper linkage 211 and the corresponding lower linkage 215 do not pivot in the same plane, but are staggered according to the crooked shape of the impact element A catch plate (not shown in detail) is pivotably supported on the axle 207 between the two upper linkages 211. The catch plate is loaded (i.e., biased) by a double leg spring (also not shown) and retained by a pivotable pawl (also not shown). The pawl itself is indirectly blocked by means of a magnetic retention device. Each upper linkage 211 bears a serrated crash lock toothing designed for interacting with the respective crash lock part hinged to the support 205. The crash lock toothing and the crash lock part make up a crash lock assembly.

The lower part of the support 205 bears a servo motor 271 consisting of an electric motor and a reduction gear. Operation of the servo motor 271 causes rotation of a horizontal output shaft. An adjuster lever 273 is rotationally fixed to (i.e., rotates with) the horizontal output shaft of the servo motor 271. In the initial position described above, the adjuster lever 273 extends obliquely downward and rearward. An adjuster bolt 275 that can be rotated around its longitudinal axis is mounted to the free end of the adjuster lever 273 and extends parallel to the output shaft of the servo motor 271. A guide tappet 277 is mounted to the adjuster bolt 275. The guide tappet 277 consists of a cylindrical tappet section 277' and a cylindrical guide section 277" that is aligned with the tappet section 277'. The cylindrical tappet section 277' has a first diameter and the cylindrical guide section 277" has a second diameter that is smaller than the first diameter.

An approximately cylindrical transverse link 281 is mounted between the two lower linkages 215. The guide tappet 277 is arranged in such a way that the tappet section 277' is arranged between the adjuster bolt 275 and the transverse link 281, and the guide section 277" extends through a radial transverse bore of a transverse link 281. The staggered transition between the tappet section 277' and the guide section 277" defines a rearward stop for engaging the transverse link. A reset spring 283 is positioned next to the guide tappet 277. The reset spring 283 is connected to and extends between the adjuster bolt 275 and the transverse link 281. Therefore, the reset spring 283 pulls the transverse link 281 towards the stop that is defined by the staggered transition between the tappet section 277' and the guide section 277".

The inventive headrest 201 has three functions: a crash function, a comfort setting function and a pre-crash-function.

In the event of crash, the double leg spring, which is the energy storage device (drive), is released via a trigger unit (with the mechanism for retaining/releasing the pawl and the pawl together forming the trigger unit). Thereafter, the double leg spring presses on the impact element 213 by means of the catch plate, and drives the impact element 213 out into the foremost position, which is the crash position, by means of the four-bar linkages 219 on either side of the headrest. The crash lock protects the four-bar linkage 219 against any further driving in that could be caused by the passenger's head crashing on the impact element 213. After the crash, the headrest 201 can be reset by releasing the crash lock.

In the case of the comfort setting, the servo motor 271 acting as a drive is used to pivot the adjuster lever 273 with the adjuster bolt 275. When driving out the impact element 213 from the initial position to one of several comfort positions further towards the front, the adjuster lever 273 is pivoted forward (in the drawing, in a clockwise direction) and the transverse link 281 is loaded by means of the tappet section 277' of the guide tappet 277 with pressure in the direction of driving out. In order to drive in the impact element 213 to a backward comfort position or to the initial position, the transverse link 281 is pulled back in the direction of driving in with a pivoting movement of the adjuster lever (in the drawing, in a counter-clockwise direction) via the reset spring 283.

For its a pre-crash-function, in the event of an imminent crash, the servo motor 271 receives from its control unit the signal to drive out forwardly according to the previously described comfort setting, but beyond the frontmost comfort position to the crash position, in which the adjuster lever 273 points frontward. If there is still enough time or the crash is avoided this crash position will be reached. Otherwise, the crash function provided via the servo motor 271 is overridden, i.e. the impact element 213 is carried along by the double leg spring, with the guide section 277" of the guide tappet 277 enabling the free forward movement of the transverse link 281 together with the four-bar linkages 219. The transverse link 281 then moves away from the step between the guide section 277" and the guide tappet 277', so that the transverse link 281 approaches the free end of the guide section 277". The same way, the impact element 213 can be driven out in the event of a crash if the pre-crash function was not activated. In any event, the reset strength of the reset spring 283 is negligible as compared to the strength of the double leg spring.

In a modified exemplary embodiment with no mechanical differences, no pre-crash function is provided, i.e. the servo motor 271 only enables the setting of comfort positions.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A headrest for a vehicle seat, wherein the headrest is for operating during at least both a crash and period of normal use that does not include a crash, the headrest comprising:
   at least one four-bar linkage, wherein the four-bar linkage includes
      (a) a support,
      (b) upper and lower linkages that are each mounted for pivoting relative to the support, and
      (c) an impact element, wherein the upper and lower linkages are each mounted for pivoting relative to the impact element;
   an energy storage device for driving the four-bar linkage in response to the crash and thereby changing the four-bar linkage's configuration in a first predetermined manner, so that the impact element moves forwardly away from the support from an initial position to a crash position, wherein the upper and lower linkages pivot relative to both the support and the impact element while the impact element moves forwardly away from the support;
   a lock for restricting rearward movement of the impact element while the impact element is in the crash position;
   a drive operative for at least indirectly bringing the headrest from the initial position to at least one other comfort position during the period of normal use;
   a guide tappet, wherein
      (a) the bringing of the headrest from the initial position to the other comfort position comprises changing the four-bar linkage's configuration in a second predetermined manner so that the impact element moves forwardly away from the support, from the initial position to the other comfort position, and
      (b) the drive is operative for moving the guide tappet so that the moving of the guide tappet at least indirectly causes the changing of the four-bar linkage's configuration in the second predetermined manner; and
   a transverse link that bears upon the four-bar linkage, wherein the guide tappet includes a section for bearing against the transverse link in a manner that at least indirectly causes the changing of the four-bar linkage's configuration in the second predetermined manner during the moving of the guide tappet.

2. The headrest according to claim 1, further comprising an adjuster lever mounted to the drive, wherein the drive is operative for pivoting the adjuster lever so that the pivoting of the adjuster lever at least indirectly causes the moving of the guide tappet.

3. The headrest according to claim 1, further comprising a reset spring that is arranged next to the guide tappet for changing the four-bar linkage's configuration in a maimer so that the impact element moves rearwardly toward the support.

4. The headrest according to claim 3, wherein:
the section of the guide tappet is a tappet section,
the guide tappet further includes a guide section, and
the guide section has a smaller diameter than the tappet section.

5. The headrest according to claim 1, wherein:
the section of the guide tappet is a tappet section,
the guide tappet further includes a guide section, and
the guide section has a smaller diameter than the tappet section.

6. The headrest according to claim 1, wherein the drive is further operative for at least indirectly bringing the headrest from the initial position to the crash position prior to the crash.

7. The headrest according to claim 1, wherein the upper linkage and the lower linkage are not parallel with respect to one another.

8. The headrest according to claim 1, wherein after the crash, the headrest can be reversibly returned from the crash position to the initial position by releasing the crash lock.

9. The headrest according to claim 1, wherein the energy storage device comprises a loaded spring, and the headrest further comprises a pivotable pawl for at least indirectly retaining the spring in the spring's initial position.

10. The headrest according to claim 9, further comprising a guide tappet, wherein:
the bringing of the headrest from the initial position to the other comfort position comprises changing the four-bar linkage's configuration in a second predetermined manner so that the impact element moves forwardly away from the support, from the initial position to the other comfort position; and
the drive is operative for moving the guide tappet so that the moving of the guide tappet at least indirectly causes the changing of the four-bar linkage's configuration in the second predetermined manner.

11. The headrest according to claim 10, further comprising a transverse link that bears upon the four-bar linkage, wherein the guide tappet includes a section for bearing against the transverse link in a manner that at least indirectly causes the changing of the four-bar linkage's configuration in the second predetermined manner during the moving of the guide tappet.

12. The headrest according to claim 1, wherein the drive is selected from the group consisting of:
a motorized drive,
a pneumatic drive, and
a hydraulic drive.

13. The headrest according to claim 1, wherein the drive comprises an electric servo motor.

14. A headrest for a vehicle seat, wherein the headrest is for operating during at least both a crash and period of normal use that does not include a crash, the headrest comprising:
at least one four-bar linkage, wherein the four-bar linkage includes
(a) a support,
(b) upper and lower linkages that are each mounted for pivoting relative to the support, and
(c) an impact element, wherein the upper and lower linkages are each mounted for pivoting relative to the impact element;
an energy storage device for driving the four-bar linkage in response to the crash and thereby changing the four-bar linkage's configuration in a first predetermined manner, so that the impact element moves forwardly away from the support from an initial position to a crash position, wherein the upper and lower linkages pivot relative to both the support and the impact element while the impact element moves forwardly away from the support;
a lock for restricting rearward movement of the impact element while the impact element is in the crash position;
a drive operative for at least indirectly bringing the headrest from the initial position to at least one other comfort position during the period of normal use;
a guide tappet, wherein
(a) the bringing of the headrest from the initial position to the other comfort position comprises changing the four-bar linkage's configuration in a second predetermined manner so that the impact element moves forwardly away from the support, from the initial position to the other comfort position, and
(b) the drive is operative for moving the guide tappet so that the moving of the guide tappet at least indirectly causes the changing of the four-bar linkage's configuration in the second predetermined manner;
an adjuster lever mounted to the drive, wherein the drive is operative for pivoting the adjuster lever so that the pivoting of the adjuster lever at least indirectly causes the moving of the guide tappet; and
a transverse link that bears upon the four-bar linkage, wherein the guide tappet includes a section for bearing against the transverse link in a manner that at least indirectly causes the changing of the four-bar linkage's configuration in the second predetermined manner during the moving of the guide tappet.

15. The headrest according to claim 14, further comprising a reset spring that is arranged next to the guide tappet for changing the four-bar linkage's configuration in a manner so that the impact element moves rearwardly toward the support.

16. In a headrest that is for a vehicle seat, includes at least one four-bar linkage, and that operates advantageously in response to a crash by automatically changing the four-bar linkage's configuration in a first predetermined manner so that an impact element of the four-bar linkage moves from an initial position to a crash position by moving forwardly away from a support of the four-bar linkage, wherein the four-bar linkage further includes upper and lower linkages that are pivotably interposed between the impact element and the support, and the upper and lower linkages pivot relative to both the support and the impact element while the impact element moves forwardly away from the support, with an improvement comprising:
a drive operative for at least indirectly changing the four-bar linkage's configuration in at least a second predetermined manner so that the impact element moves forwardly away from the support, from the initial position to at least one other comfort position, wherein the second predetermined manner is different from the first predetermined manner, and the other comfort position is different from the crash position; and
an apparatus interposed between the drive and the four-bar linkage, wherein
(a) the apparatus is for transmitting motion from the drive to the four-bar linkage, so that the changing of the four-bar linkage's configuration in the second predetermined manner is by way of the apparatus,
(b) the apparatus includes a tappet and an adjuster lever,
(c) the adjuster lever is mounted to the drive, (d) the drive is operative for pivoting the adjuster lever so that the pivoting of the adjuster lever at least indirectly causes moving of the tappet, and (e) the tappet is mounted so that the moving of the tappet at least indirectly causes the changing of the four-bar linkage's configuration in the second predetermined manner.

17. The headrest according to claim 16 wherein the drive comprises an electric servo motor.

18. The headrest according to claim 16, wherein the drive is selected from the group consisting of:
a motorized drive,
a pneumatic drive, and
a hydraulic drive.

19. In a headrest that is for a vehicle seat, includes at least one four-bar linkage, and that operates advantageously in response to a crash by automatically changing the four-bar linkage's configuration in a first predetermined manner so that an impact element of the four-bar linkage moves from an initial position to a crash position by moving forwardly away from a support of the four-bar linkage, wherein the four-bar linkage further includes upper and lower linkages that are pivotably interposed between the impact element and the support, and the upper and lower linkages pivot relative to both the support and the impact element while the impact element moves forwardly away from the support, with an improvement comprising:
a drive operative for at least indirectly changing the four-bar linkage's configuration in at least a second predetermined manner so that the impact element moves forwardly away from the support, from the initial position to at least one other comfort position, wherein the second predetermined manner is different from the first predetermined manner, and the other comfort position is different from the crash position, and wherein the drive comprises an electric servo motor; and
a tappet, wherein the drive is operative for moving the tappet so that the moving of the tappet at least indirectly causes the changing of the four-bar linkage's configuration in the second predetermined manner.

20. The headrest according to claim 19, further comprising an adjuster lever mounted to the drive, wherein the drive is operative for pivoting the adjuster lever so that the pivoting of the adjuster lever at least indirectly causes the moving of the tappet.

21. The headrest according to claim 19, further comprising a transverse link that bears upon the four-bar linkage, wherein the tappet is for bearing against the transverse link in a manner that at least indirectly causes the changing of the four-bar linkage's configuration in the second predetermined manner during the moving of the tappet.

22. A headrest for a vehicle seat, wherein the headrest is for operating during at least both a crash and period of normal use that does not include a crash, the headrest comprising:
at least one four-bar linkage, wherein the four-bar linkage includes
(a) a support,
(b) upper and lower linkages that are each mounted for pivoting relative to the support, and
(c) an impact element, wherein the upper and lower linkages are each mounted for pivoting relative to the impact element;
an energy storage device for driving the four-bar linkage in response to the crash and thereby changing the four-bar linkage's configuration in a first predetermined manner, so that the impact element moves forwardly away from the support from an initial position to a crash position, wherein the upper and lower linkages pivot relative to both the support and the impact element while the impact element moves forwardly away from the support, and the energy storage device comprises a loaded spring;
a lock for restricting rearward movement of the impact element while the impact element is in the crash position;
a drive operative for at least indirectly bringing the headrest from the initial position to at least one other comfort position during the period of normal use; and
a pivotable pawl for at least indirectly retaining the spring in the spring's initial position.

23. The headrest according to claim 22, further comprising a guide tappet, wherein:
the bringing of the headrest from the initial position to the other comfort position comprises changing the four-bar linkage's configuration in a second predetermined manner so that the impact element moves forwardly away from the support, from the initial position to the other comfort position; and
the drive is operative for moving the guide tappet so that the moving of the guide tappet at least indirectly causes the changing of the four-bar linkage's configuration in the second predetermined manner.

* * * * *